(12) United States Patent
Walser (10) Patent No.: US 10,947,768 B2
(45) Date of Patent: Mar. 16, 2021

(54) DOOR SENSOR WITH ROTATION ANGLE ENCODER

(71) Applicant: CEDES AG, Landquart (CH)

(72) Inventor: Simon Walser, Trimmis (CH)

(73) Assignee: CEDES AG, Landquart (CH)

( * ) Notice: Subject to any disclaimer, the term of this patent is extended or adjusted under 35 U.S.C. 154(b) by 0 days.

(21) Appl. No.: 16/268,847

(22) Filed: Feb. 6, 2019

(65) Prior Publication Data
US 2019/0257130 A1    Aug. 22, 2019

(30) Foreign Application Priority Data
Feb. 16, 2018   (EP) .................................... 18157281

(51) Int. Cl.
| | |
|---|---|
| *E05F 7/00* | (2006.01) |
| *G01C 19/5776* | (2012.01) |
| *H04N 5/225* | (2006.01) |
| *E05F 15/43* | (2015.01) |
| *G01D 11/30* | (2006.01) |
| *E05F 15/73* | (2015.01) |
| *E05F 15/42* | (2015.01) |

(52) U.S. Cl.
CPC ................ *E05F 7/00* (2013.01); *E05F 15/43* (2015.01); *G01C 19/5776* (2013.01); *G01D 11/30* (2013.01); *H04N 5/2253* (2013.01); *E05F 15/73* (2015.01); *E05F 2015/483* (2015.01); *E05F 2015/765* (2015.01); *E05Y 2900/132* (2013.01)

(58) Field of Classification Search
CPC .. H04N 5/2253; G01D 11/30; G01C 19/5776; E05F 15/43; E05F 7/00; E05F 2015/765; E05F 15/73; E05F 2015/483; E05Y 2900/132
See application file for complete search history.

(56) References Cited

U.S. PATENT DOCUMENTS

| | | | |
|---|---|---|---|
| 6,970,085 B2 * | 11/2005 | Okabe | E05F 15/74 340/545.6 |
| 7,849,741 B2 * | 12/2010 | Tateyama | G01C 19/5607 73/504.12 |
| 8,717,546 B2 | 5/2014 | De Coi et al. | |
| 8,868,376 B2 | 10/2014 | De Coi | |
| 8,875,441 B2 | 11/2014 | Agam et al. | |

(Continued)

FOREIGN PATENT DOCUMENTS

| | | |
|---|---|---|
| DE | 10 2007 038 421 B3 | 9/2008 |
| DE | 10 2009 024 601 A1 | 4/2010 |

(Continued)

OTHER PUBLICATIONS

Extended European Search Report (Application No. 18 15 7281.9) dated Aug. 30, 2018.

(Continued)

*Primary Examiner* — Boubacar Abdou Tchoussou
(74) *Attorney, Agent, or Firm* — Burr & Brown, PLLC (57) ABSTRACT

Door sensor (30) for installation on the door leaf (21) of a swing or revolving door (20), having a 3D image sensor for monitoring a monitoring field (30) in front of the door leaf, having a rotation angle encoder for detecting the rotation angle of the door leaf, wherein the door sensor has a common support that connects the 3D image sensor to the rotation angle encoder.

11 Claims, 6 Drawing Sheets

(56) References Cited

U.S. PATENT DOCUMENTS

| | | | |
|---|---|---|---|
| 10,240,921 B2* | 3/2019 | Scheiermann | G01B 21/22 |
| 2004/0140782 A1 | 7/2004 | Okabe et al. | |
| 2008/0257042 A1* | 10/2008 | Tateyama | G01C 19/5607 |
| | | | 73/504.12 |
| 2012/0127317 A1 | 5/2012 | Yantek et al. | |
| 2012/0150487 A1* | 6/2012 | Coi | F16M 11/06 |
| | | | 702/155 |
| 2013/0148102 A1* | 6/2013 | Oggier | G01C 3/08 |
| | | | 356/5.01 |
| 2014/0232550 A1* | 8/2014 | Read | G01D 4/002 |
| | | | 340/870.02 |
| 2015/0128496 A1* | 5/2015 | Phillips | E05B 65/10 |
| | | | 49/13 |
| 2016/0282112 A1* | 9/2016 | Scheiermann | G01D 1/16 |
| 2018/0031604 A1* | 2/2018 | Chennakeshu | G01C 9/02 |
| 2020/0102779 A1* | 4/2020 | Rabinowitz | E05F 15/624 |

FOREIGN PATENT DOCUMENTS

| | | |
|---|---|---|
| EP | 2 453 254 A1 | 5/2012 |
| EP | 2 453 260 B1 | 4/2014 |
| EP | 2 453 252 B1 | 6/2015 |
| EP | 2 698 649 B1 | 7/2015 |
| EP | 2 667 218 B1 | 10/2017 |
| GB | 2498315 A | 7/2013 |
| WO | 2012/071664 A1 | 6/2012 |

OTHER PUBLICATIONS

European Office Action, European Application No. 18157281.9, dated Oct. 20, 2020 (5 pages).

* cited by examiner

DOOR SENSOR WITH ROTATION ANGLE ENCODER

FIELD OF THE INVENTION

The present invention relates to a door sensor carried along on the door leaf and having a rotation angle encoder.

BACKGROUND OF THE INVENTION

The prior art discloses door sensors installed on the door leaf of a swing door. The patents EP 2 453 254 A1, EP 2 453 260 B1, EP 2 698 649 B1, EP 2 453 252 B1 and EP 2 667 218 B1 from the applicant describe a sensor of the type in question.

SUMMARY OF THE INVENTION

It is an object of the present invention to provide an improved door sensor.

The door sensor according to the present invention is a door sensor for installation on the door leaf of a swing or revolving door, having a 3D image sensor for monitoring a monitoring field in front of the door leaf, having a rotation angle encoder for detecting the rotation angle of the door leaf, wherein the door sensor has a common support that connects the 3D image sensor to the rotation angle encoder.

The door sensor according to the present invention can produce the advantage that the door sensor can be used to process the rotation angle of the door leaf without the need for input from the outside. It can, therefore, also be used with simple and inexpensive door controllers.

Preferably, the rotation angle encoder is an at least 2-axis rotation angle encoder. This can produce the advantage that the door sensor can recognize its installation situation.

Preferably, the rotation angle encoder is a gyro sensor. This can produce the advantage that the door sensor can be designed to be inexpensive and small.

Preferably, the common support defines an installation plane for installation on the door leaf and the rotation angle encoder is arranged with an inclination in relation to the installation plane and is, in particular, arranged with an inclination of 15°. This can produce the advantage that the gyro sensor can be oriented along the main axes of the door sensor inside the door sensor.

Preferably, the common support comprises an edge or marker for horizontally and/or vertically orienting the support on the door leaf, and the rotation angle encoder is arranged with an inclination that relates to the edge or marker and is, in particular, arranged with an inclination of 30°. This can produce the advantage that the gyro sensor can be oriented along the main axes of the door sensor inside the door sensor.

Preferably, the common support has a mounting plate for holding the 3D image sensor and the rotation angle encoder in a stable position, which mounting plate has a plane for installation on the door leaf and/or which comprises an edge or a marker intended to be arranged on the door leaf in a horizontal and/or vertical orientation, wherein the rotation angle encoder is arranged with a 1-axis or 2-axis inclination in relation to two vertical axes in the installation plane, in particular, the main axes of the door leaf. This can produce the advantage that the door sensor along with the gyro sensor can be installed and oriented in relation to the door leaf in a simple and precise manner.

Preferably, the door sensor has a predetermined side for installation in the direction of the door leaf. This can produce the advantage that the torsion-resistant installation can be simple and precise.

Preferably, the rotation angle encoder is a 3-axis rotation angle encoder, in particular, a 3-axis gyro sensor. This can produce the advantage that a commercially available and thus inexpensive gyro sensor can be used.

Preferably, the door sensor has a memory for storing ambient parameters, in particular, of the side of the door (inside of the door or outside of the door), the direction of rotation (door rotating left or right) and the maximum rotation angle of the door leaf. This can have the advantage that the door sensor can be taught ambient variables.

The door according to the present invention is a door, in particular, a swing or revolving door, having one of the aforementioned door sensors, wherein the door sensor is fitted on the surface of the door leaf of the door and, in particular, is fitted at the top on the door leaf, in particular, is fitted in the upper 90% of the door leaf, in particular, is fitted on the axis of rotation side, in particular, less than 20%, in particular, less than 10%, of the width of the door leaf away from the axis of rotation. The door according to the present invention can produce the aforementioned advantages.

BRIEF DESCRIPTION OF THE DRAWINGS

Further features of the present invention are indicated in the drawings and the abstract.

The advantages cited in each case can also be implemented for combinations of features in the context of which they have not been cited.

BRIEF DESCRIPTION OF THE DRAWINGS

An exemplary embodiment of the present invention is depicted in the drawings. All the drawings relate to the same door sensor according to the present invention in the same arrangement on the door leaf, unless expressly explained otherwise. The same reference signs in the individual figures denote corresponding elements in this case.

DETAILED DESCRIPTION OF THE INVENTION

Figure 1:
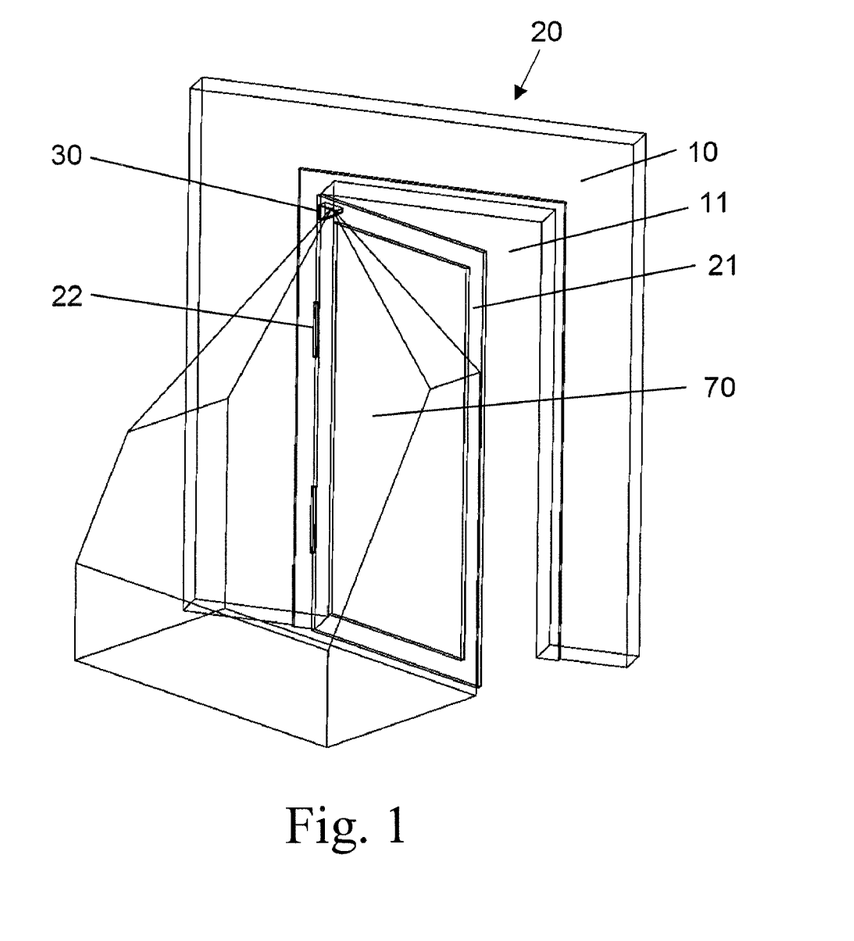
FIG. 1 shows a door with a door sensor in a 3D view.

FIG. 1 shows a door 20 with the door sensor 30 in a 3D view.

The door 20 has a door leaf 21 that is mounted rotatably on the wall 10 by means of door hinges 22. The door leaf can be closed or can be opened in a direction, in this case in the direction of the observer, so that the door leaf opens the door opening 11.

The door hinge 20 defines the axis of rotation of the door leaf. The axis of rotation is the axis around which the door leaf can be moved through a particular rotation angle. When the door is closed, the rotation angle is assumed to be zero. When the door is open to the maximum, the door is open at the maximum rotation angle.

The door 20 is a swing door that can be opened only in one direction.

The door and the door leaf have two sides of the door. The first side of the door is the inside of the door, which is the side in whose direction the door is opened. The second side of the door is the outside of the door, which is the side in whose direction the door is closed.

A door can have one of two directions of rotation. The direction of rotation of a door is the side on which the axis of rotation of the door is on the inside of the door. The direction of rotation can be rotating right or rotating left. The door 20 has the axis of rotation on the left-hand side and thus the one rotating left.

On the door leaf 21, the door sensor 30 is installed on the inside of the door at the top on the axis of rotation side on the door leaf at a very short distance (less than 20 cm or less than 10% of the width or height of the door leaf) from the upper and lateral termination of the door leaf. The door sensor 30 monitors the three-dimensional monitoring field 70. The door sensor installed in this manner is referred to as carried along on the door leaf. Similarly, the monitoring field 70 is carried along with the door leaf. That is to say that at least part of the monitoring field can be constant in relation to the door leaf. The figure shows a realistic depiction of the possible extent of the monitoring field.

The door 20 is a door driven by motor by means of a door controller, and the door sensor is designed to take its detection in the monitoring field as a basis for transferring signals to the door controller. This can be a safety signal for stopping the door, for example, if a person in the monitoring field is detected in the field of movement of the door leaf. This can also be an opening signal for opening the door, for example, if a person walking towards the door is detected in the monitoring field.

Figure 2:
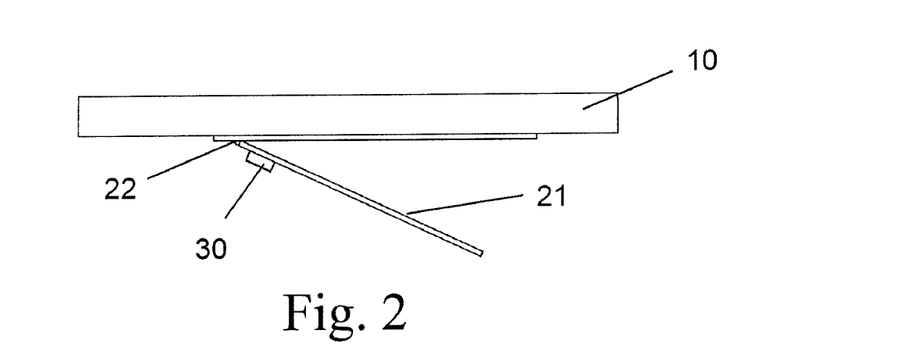
FIG. 2 shows a door with a door sensor in a plan view.

FIG. 2 shows the door of FIG. 1 in a plan view.

Figure 3:
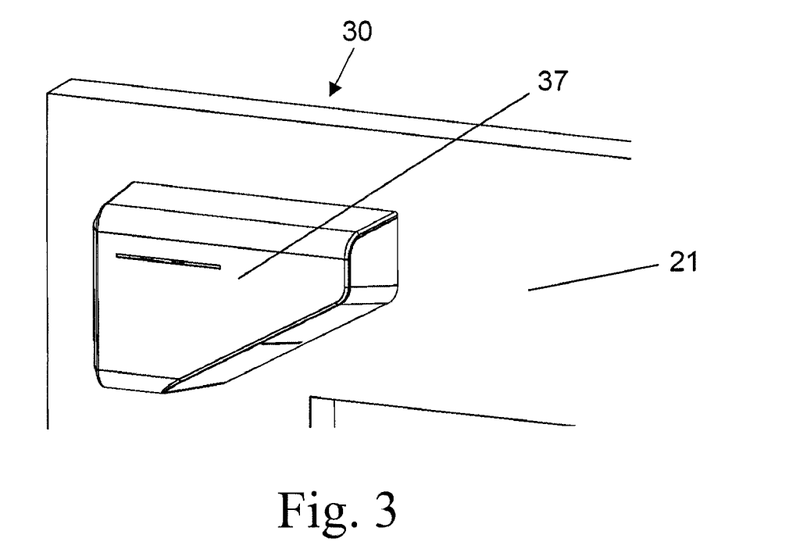
FIG. 3 shows a door sensor with a housing.

FIG. 3 shows the door sensor 30 with a housing 37 on the door leaf 21 as a detail from FIG. 1.

Figure 4:
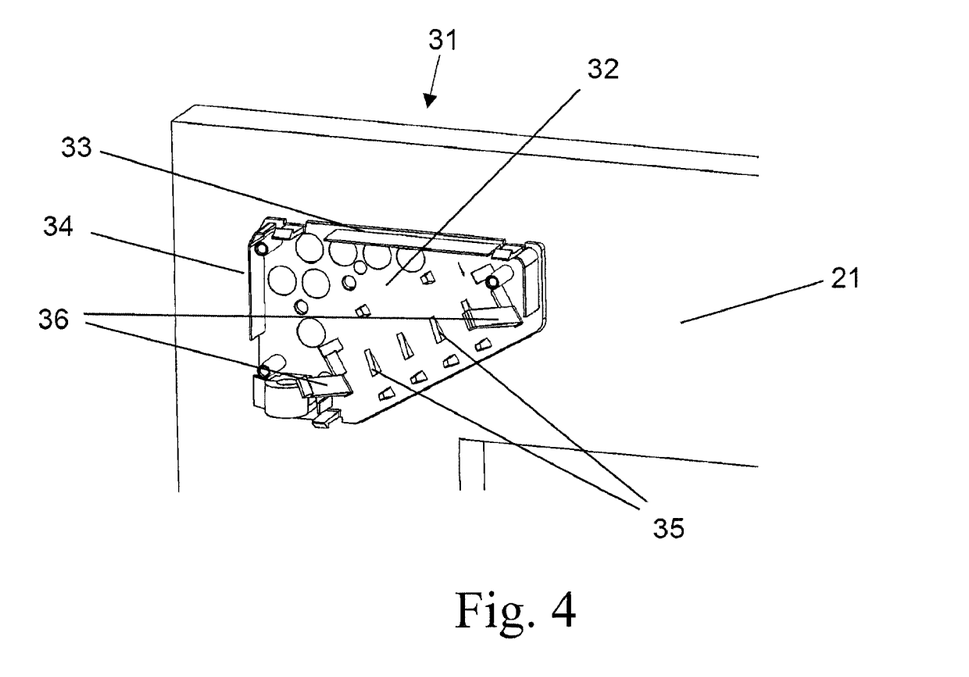
FIG. 4 shows a mounting plate for the door sensor.

FIG. 4 shows a mounting plate 31 for the door sensor as a detail from FIG. 3. The mounting plate 31 has a plane 32 for surface-parallel installation on the door leaf 21, a horizontal edge 33 for orientation parallel to the upper edge of the door leaf and a vertical edge 34 for orientation parallel to the lateral edge of the door leaf. The mounting plate has support elements 35 for defined angular orientation of the door sensor in relation to the plane of the door leaf. The mounting plate has retaining elements 36 for fixing and defined angular orientation of the door sensor in relation to the horizontal and the upper edge of the door leaf.

Figure 5:
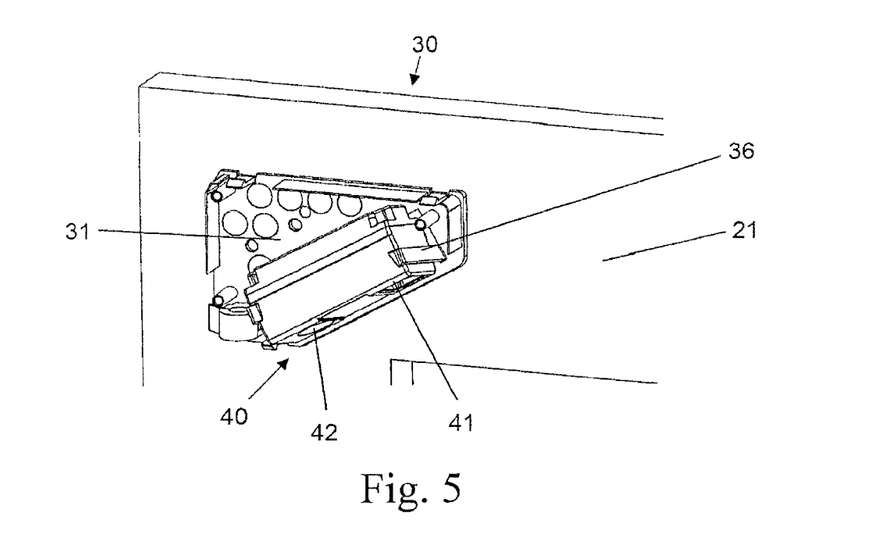
FIG. 5 shows a door sensor on the mounting plate.

FIG. 5 shows the door sensor 30 with the mounting plate 31 on the door leaf 21 likewise as a detail from FIG. 3. The door sensor has a 3D image sensor 40 that has a transmitter 41 and a receiver 42. The transmitter sends IR radiation modulated with 20 MHz into the monitoring area. The receiver is a pixel matrix sensor that receives the radiation of the transmitter that is reflected from the monitoring area as an image and is designed to detect, for each of the pixels of the image, the phase shift in the modulation of the received radiation in comparison with the transmitted radiation. On the basis of the phase shift, the receiver ascertains, for each of the pixels of said image, the distance of the surface reflecting onto this pixel in the monitoring space and thus generates a 3D image. Instead of the phase shift, other door sensors use the time of flight of the transmitted and reflected radiation, which is ultimately similar. These door sensors are also called TOF (time of flight) sensors. The pixels of the receiver used are also called demodulation pixels.

Figure 6:
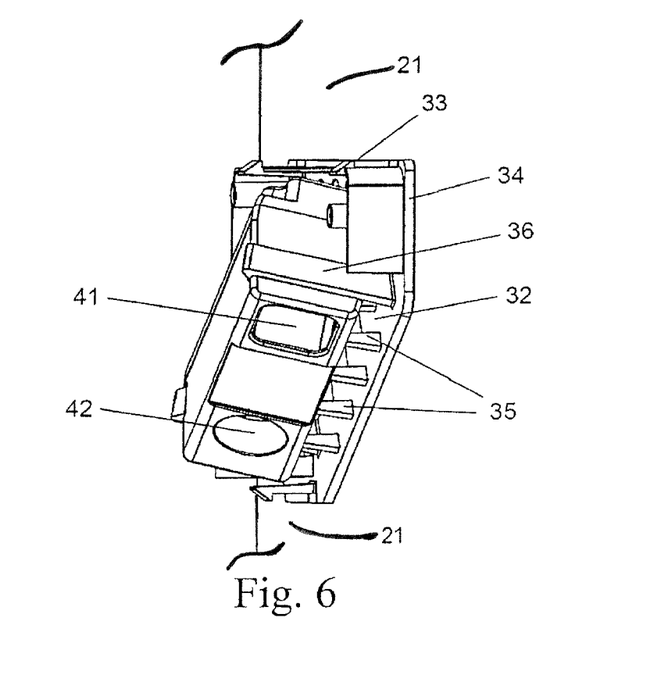
FIG. 6 shows a door sensor on the mounting plate.

FIG. 6 shows the door sensor 30 likewise as a detail from FIG. 3. The support elements 35, in association with the plane 32 of the mounting plate, fix the line of sight and main axes of the door sensor in relation to the plane of the door leaf. The retaining elements 36, in association with the horizontal edge 33 and the vertical edge 34 of the mounting plate, fix the line of sight and main axes of the door sensor in relation to the horizontal and the upper edge of the door leaf. The line of sight and main axis of the door sensor is defined by the optical axes of transmitter 41 and receiver 42.

Figure 7:
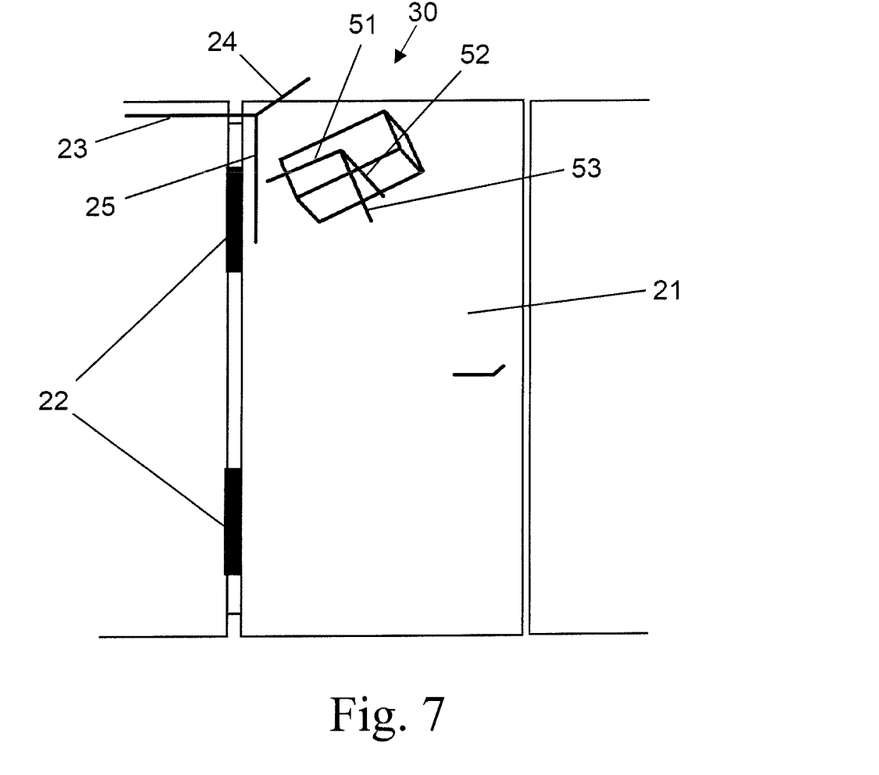
FIG. 7 shows an orientation of the door sensor.

FIG. 7 shows the orientation of the door sensor 30 in relation to the door leaf 21 as a detail from the preceding figures.

The coordinate system of the door leaf has its zero point in the axis of rotation at the upper end of the door leaf. The X axis 23 of the door leaf runs horizontally in the direction of the hinge 22, the Y axis 24 of the door leaf runs perpendicularly to the plane of the door leaf on the outside of the door, that is to say away from the observer, and the Z axis 25 of the door leaf runs vertically downward.

The coordinate system of the door sensor has its zero point in the door sensor. The X axis 51 of the door sensor is rotated downward through 30° around the Y axis of the door leaf in comparison with the X axis of the door leaf. The Z axis 53 of the door sensor is rotated forward to the observer through 15° around the X axis of the door sensor in comparison with the plane of the door leaf. The Y axis 52 of the door sensor is obtained in corresponding fashion and points away from the observer. The main line of sight of the door sensor is thus diagonally downward and is swiveled through 30° from the vertical in relation to the outer edge of the door leaf and forward through 15° from the plane of the door leaf.

The door sensor has a 3-axis gyro sensor as rotation angle encoder and is not depicted in the figures. The gyro sensor is oriented according to the coordinate system of the door sensor.

Figure 8:
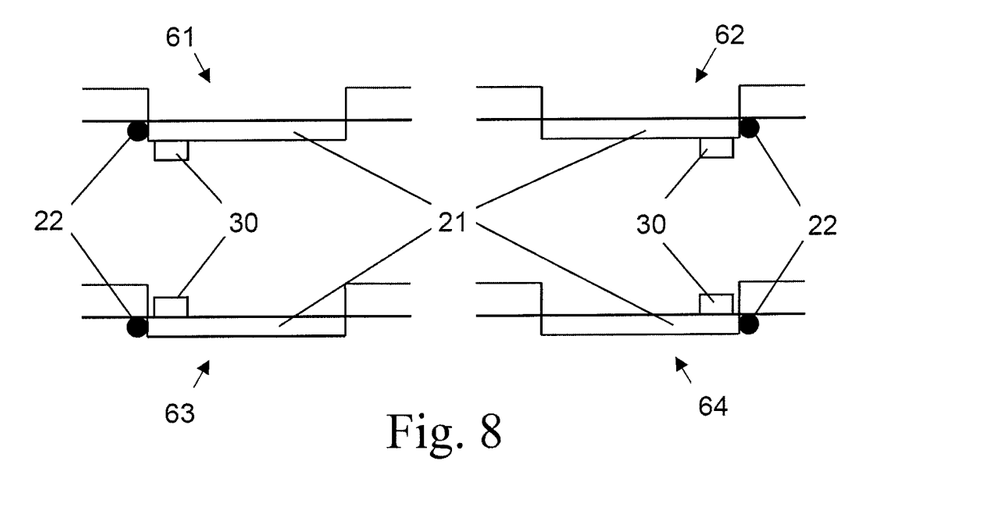
FIG. 8 shows installation situations.

FIG. 8 shows the four installation situations of the door sensor 30 on a door leaf 30. The installation situation 61 corresponds to the preceding figures. The installation situations 62, 63 and 64 do not correspond to the preceding figures.

The installation situations 61 and 62 show the door sensor 30 on the inside of the door of the door leaf 21, while the installation situations 63 and 64 show the door sensor 30 on the outside of the door of the door leaf 21. The installation situations 61 and 63 show the door sensor 30 on a left-rotating door, since the hinges 22 are arranged on the left-hand side of the inside of the door. The installation situations 62 and 64 show the door sensor 30 on a right-rotating door, since the hinges 22 are arranged on the right-hand side of the inside of the door.

There are thus four different installation situations provided by the combination of the two possible sides of the door (inside of the door or outside of the door) and the two possible directions of rotation of the door leaf (rotating right or rotating left). These are specifically:

Installation on outside of of a left-rotating situation 61: the door door
Installation on outside of of a right-rotating situation 62: the door door
Installation on inside of of a left-rotating situation 63: the door door
Installation on inside of of a right-rotating situation 64: the door door In a learning mode, the rotation angle sensor detects a rotation around all 3 axes when the door is opened. From this, the door sensor ascertains the direction of rotation around each of its axes. From the direction of rotation of the 3 axes, the door sensor now explicitly ascertains the relevant installation situation on the basis of the table below. A positive direction of rotation in the mathematical sense is indicated here by "+".

| X axis direction of rotation | Y axis direction of rotation | Z axis direction of rotation | Installation situation |
|---|---|---|---|
| + | + | + | 61 |
| − | + | − | 62 |
| + | − | + | 63 |
| − | − | − | 64 |

It can be seen from the table that the detection of only 2 axes would suffice if these are the axes X and Y or Y and Z, since these axes alone also allow explicit association of the installation situation. In this respect, it is sufficient to use a 2-axis rotation angle encoder for the door sensor.

Similarly, it should be noted that it is sufficient to rotate the coordinate system of the rotation angle encoder just around one axis relative to the door leaf. It is thus sufficient to rotate the Z axis 53 of the rotation angle encoder forward toward the observer through 15° around the X axis of the door sensor in comparison with the plane of the door leaf. The X axis of the rotation angle encoder can thus remain parallel to the X axis of the door leaf.

Figure 9:
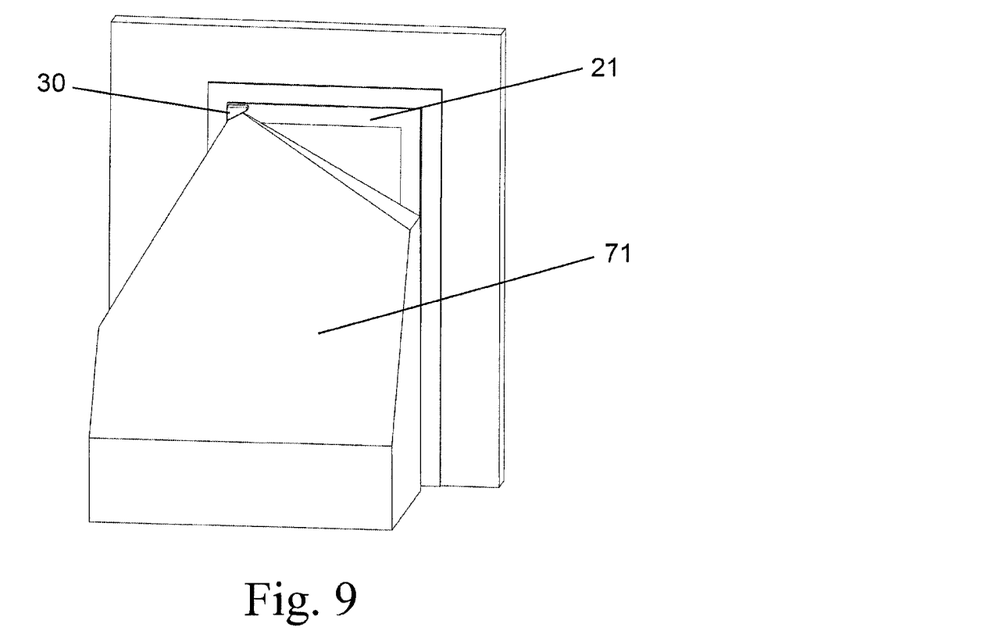
FIG. 9 shows a monitoring field of a closed door.

FIG. 9 shows the monitoring field 71 of the door sensor 30 with the door leaf 21 closed. The monitoring field 71 ends at the outer edge of the door.

Figure 10:
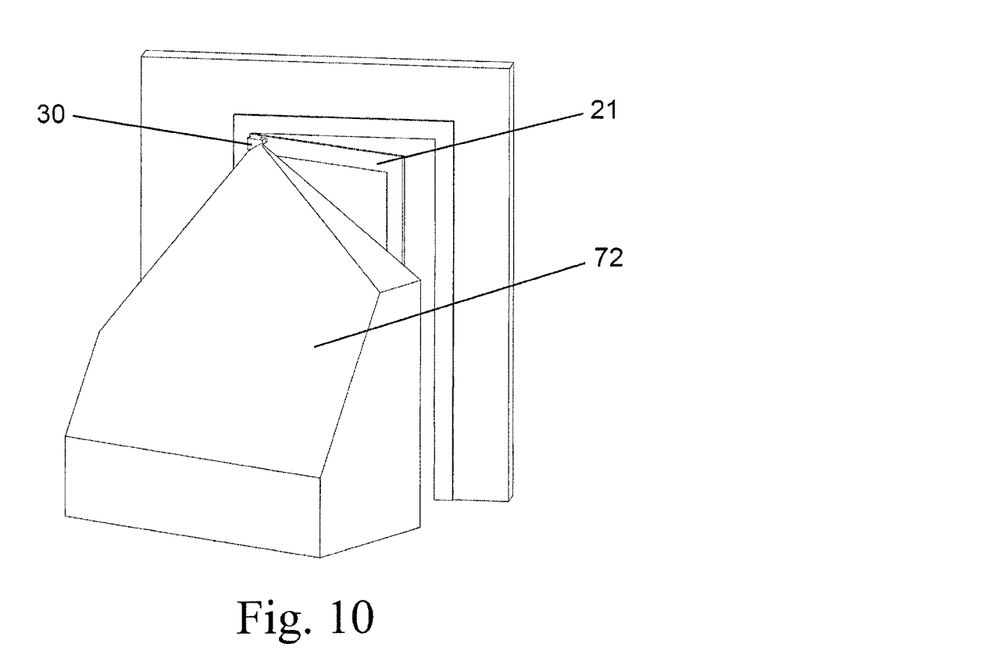
FIG. 10 shows a monitoring field of an open door.

FIG. 10 shows the enlarged monitoring field 72 of the door sensor 30 with the door leaf 21 of the same door as in FIG. 9 slightly open. The monitoring field 72 now extends beyond the outer edge of the door. The door sensor 30 of FIGS. 9 and 10 is thus designed to alter the monitoring field on the basis of the rotation angle and in this case to enlarge it if the rotation angle increases.

The door sensor can be designed so that the maximum enlargement is reached at a rotation angle of the door leaf of approximately 45°, so that the monitoring field is reduced to the end of the outer edge of the door again when the door leaf is closed or open through 90° or completely.

Figure 11:
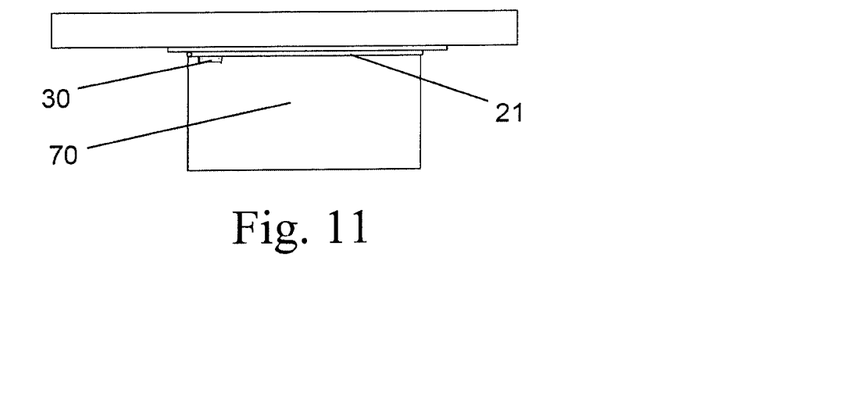
FIG. 11 shows a rear monitoring field with the door closed.
Figure 12:
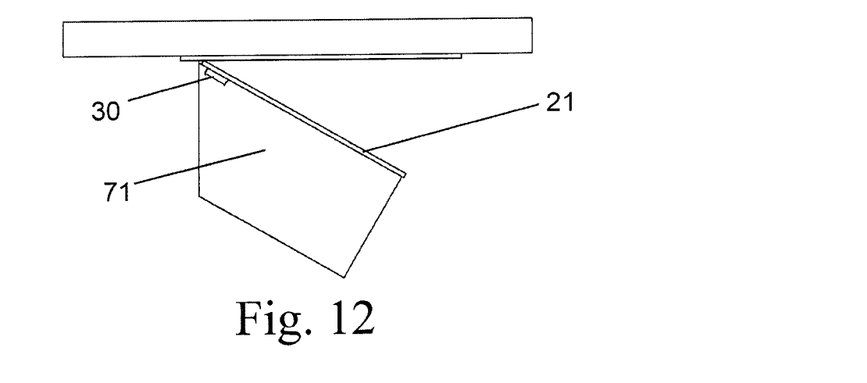
FIG. 12 shows a rear monitoring field with the door slightly open.
Figure 13:
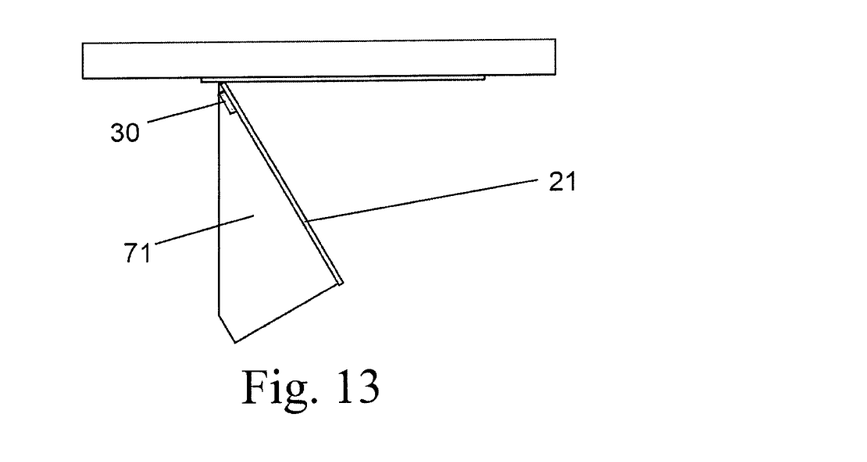
FIG. 13 shows a rear monitoring field with the door open further.

FIGS. 11-13 each show a door with a door leaf 21 having a door sensor 30 and the monitoring field 70, 71 for different rotation angles of the door leaf in a plan view.

The rotation angle for the door leaf of the door shown in FIGS. 11-13 is limited to a radial boundary line at 90°, for example by a floor stop, by a vertically adjacent wall, by a restriction of the door mechanism or by a restriction by the door control of the motor-powered door drive.

The door leaf 11 in FIG. 11 is closed and the monitoring field 70 extends vertically into the space in front of the door leaf as a rectangle adjacent to the door leaf over the width of the door leaf.

The door leaf 11 in FIG. 12 is open through 30° and that in FIG. 13 is open through 60°, and the monitoring field 71 extends vertically into the space in front of the door leaf as a rectangle adjacent to the door leaf over the width of the door leaf, the monitoring field 71 on the hinge side of the door being decreased such that the monitoring field does not extend beyond the radial boundary line of the maximum movement of the door leaf.

The door sensor is thus designed to change the extent of the monitoring field on the basis of the rotation angle of the door leaf such that the monitoring field is always truncated by the plane of the door leaf at maximum opening angle and thus does not extend beyond this plane. As a result, it is also possible to achieve masking of a wall, for example, so that the wall is not detected as an obstacle object as the door sensor approaches.

Summary of the Features of the Door Sensor:

Door sensor for installation on the door leaf of a swing or revolving door, having a 3D image sensor for monitoring a monitoring field in front of the door leaf, having a rotation angle encoder for detecting the rotation angle of the door leaf, wherein the door sensor has a common support that connects the 3D image sensor to the rotation angle encoder. Preferably, the rotation angle encoder is an at least 2-axis rotation angle encoder. Preferably, the rotation angle encoder is a gyro sensor. Preferably, the common support defines an installation plane for installation on the door leaf and the rotation angle encoder is arranged with an inclination in relation to the installation plane and is, in particular, arranged with an inclination of 15°. Preferably, the common support comprises an edge or marker for horizontally and/or vertically orienting the support on the door leaf, and the rotation angle encoder is arranged with an inclination that relates to the edge or marker and is, in particular, arranged with an inclination of 30°. Preferably, the common support has a mounting plate for holding the 3D image sensor and the rotation angle encoder in a stable position, which mounting plate has a plane for installation on the door leaf and/or comprises an edge or a marker intended to be arranged on the door leaf in a horizontal and/or vertical orientation, wherein the rotation angle encoder is arranged with a 1-axis or 2-axis inclination in relation to two vertical axes in the installation plane, in particular, the main axes of the door leaf. Preferably, the door sensor has a predetermined side for installation in the direction of the door leaf. Preferably, the rotation angle encoder is a 3-axis rotation angle encoder, in particular, a 3-axis gyro sensor. Preferably, the door sensor has a memory for storing ambient parameters, in particular, the side of the door (inside of the door or outside of the door), the direction of rotation (left- or right-rotating door) and the maximum angle of rotation of the door leaf.

Method for teaching parameters for a door sensor for monitoring a monitoring field in front of the door leaf of a door for installation on the door leaf of a swing or revolving door having an at least 2-axis rotation angle encoder having at least 1-axis inclination in relation to the door leaf, wherein the following method steps are carried out: using an at least 2-axis rotation angle encoder having at least 1-axis inclination in relation to the door leaf, opening the door leaf of the closed door, detecting the rotation of the two axes of the rotation angle encoder during opening, ascertaining the direction of rotation of the two axes on the basis of the rotation thereof, ascertaining the side of the door (inside of the door or outside of the door) on which the door sensor is installed on the door leaf on the basis of the direction of rotation of the two axes and storing the side of the door (inside or outside) in a memory, in particular, a memory of the door sensor. Preferably, further method steps are ascertaining the direction of rotation of the door leaf (rotating left or right) on the basis of the direction of rotation of at least one axis of the rotation angle encoder and storing the direction of rotation in a memory, in particular, in a memory of the door sensor. Preferably, further method steps are opening the door to the maximum, in particular, with subsequent reversing, in particular, with subsequent closing of the door, detecting the maximum rotation angle on the basis of the standstill or the reversal of movement on the basis of the reversion of the rotation on the basis of the opening to the maximum and storing the maximum rotation angle in a memory, in particular, in a memory of the door sensor. Preferably, a further method step is using an at least two-axis rotation angle encoder having two-axis inclination in relation to the door leaf. Preferably, a further method step is using a 3-axis rotation angle encoder. Preferably, a further method step is using a gyro sensor as rotation angle encoder.

Door sensor for installation on the door leaf of a swing or revolving door, having a 3D image sensor for monitoring a monitoring field in front of the door leaf, having a rotation angle encoder or a signal input for detecting the rotation angle of the door leaf, wherein the door sensor is designed to change the extent of the monitoring field on the basis of the rotation angle. Preferably, the door sensor is designed to change the extent of the monitoring field in the direction of the outer edge of the door on the basis of the rotation angle. Preferably, the door sensor is designed to at least partially enlarge the extent as the rotation angle increases. Preferably, the door sensor is designed to initially enlarge the extent and then decrease it again as the rotation angle increases. Preferably, the door sensor is designed to at least partially decrease the extent as the rotation angle increases. Preferably, the door sensor is designed to initially decrease the extent and then enlarge it again as the rotation angle increases. Preferably, the door sensor is designed to change the extent of the monitoring field on the basis of the maximum rotation angle of the opening of the door leaf. Preferably, the door sensor is designed to change the monitoring field such that it substantially does not extend beyond the plane of the door leaf at maximum rotation angle, in particular, it does not extend beyond the plane of the door leaf at maximum rotation angle over a stipulated section of space, in particular, does not extend beyond the plane of the door leaf at maximum rotation angle. Preferably, the door sensor has a common support that connects the 3D image sensor to the rotation angle encoder. Preferably the rotation angle encoder is a gyro sensor. Preferably, the change in the extent of the monitoring field is brought about by a change in the evaluated points in space.

Door, in particular, a swing or revolving door, having one of the aforementioned door sensors, wherein the door sensor is fitted on the surface of the door leaf of the door and, in particular, is fitted at the top on the door leaf, in particular, is fitted in the upper 90% of the door leaf, in particular, is fitted on the axis of rotation side, in particular, less than 20%, in particular, less than 10%, of the width of the door leaf away from the axis of rotation.

LIST OF REFERENCE SIGNS

10 Wall
11 Door opening
20 Door
21 Door leaf
22 Door hinge
23 X axis of the door leaf
24 Y axis of the door leaf
25 Z axis of the door leaf
30 Door sensor
31 Mounting plate
32 Plane of the mounting plate
33 Horizontal edge of the mounting plate
34 Vertical edge of the mounting plate
35 Support elements
36 Retaining elements
37 Housing
40 3D image sensor
41 Transmitter
42 Receiver
50 3-axis gyro sensor
51 X axis of the gyro sensor
52 Y axis of the gyro sensor
53 Z axis of the gyro sensor
61 1st case of the arrangement
62 2nd case of the arrangement
63 3rd case of the arrangement
64 4th case of the arrangement
70 Monitoring field
71 Reduced monitoring field
72 Enlarged monitoring field

The invention claimed is:

1. A door sensor installable on a door leaf of a swing or revolving door, in one of a plurality of mounting situations, including mounted on an outside of a left-rotating door, mounted on an inside of the left-rotating door, mounted on an outside of a right-rotating door, and mounted on an inside of the right-rotating door, the door sensor comprising:
   a three-dimensional (3D) image sensor monitoring a monitoring field in front of the door leaf, the sensor including a transmitter and a receiver, and a rotation angle encoder,
   the rotation angle encoder detecting an angle of rotation of the door leaf, and
   a common support which connects the 3D image sensor with the rotation angle encoder,
   wherein the common support includes an installation plane mounting the door sensor on the door leaf and the rotation encoder is arranged inclined with respect to the installation plane by 15 degrees, and a mounting plate having one of an edge or a marker for one of horizontal or vertical alignment of the common support on the door leaf,
   wherein an angle of the rotation encoder is inclined by 30 degrees with respect to the edge or marker; and
   wherein the rotation angle encoder is configured to, in a learning mode, detect rotation around at least two axes when the door is opened, ascertain a direction of rotation around the at least two axes, and ascertain a relevant installation situation.

2. The door sensor according to claim 1, wherein the rotation encoder is an at least 2-axis rotation angle encoder.

3. The door sensor according to claim 1, wherein the rotation angle encoder is a gyro sensor.

4. The door sensor according to claim 1, wherein the mounting plane holds the 3D image sensor and the rotation angle encoder in a stable position, and wherein the rotation angle encoder is arranged with a 1-axis inclination or a 2-axis inclination in relation to two vertical axes in the installation plane.

5. The door sensor according to claim 1, wherein the door sensor has a predetermined side for installation in a rotation direction of the door leaf.

6. The door sensor according to claim 1, wherein the rotation angle encoder is a 3-axis rotation angle encoder.

7. The door sensor according to claim 1, wherein the door sensor has a memory for storing ambient parameters.

8. A door having a door sensor according to claim 1, wherein the door sensor is fitted on the door leaf of the door.

9. The door sensor according to claim 6, wherein the rotation angle encoder is a 3-axis gyro sensor.

10. A door according to claim 8, wherein the door sensor is fitted at a top of the door leaf.

11. A door according to claim 8, wherein the door sensor is fitted on the axis of rotation side of the door leaf.

\* \* \* \* \*